(12) United States Patent
Garnett

(10) Patent No.: US 6,356,637 B1
(45) Date of Patent: Mar. 12, 2002

(54) FIELD PROGRAMMABLE GATE ARRAYS

(75) Inventor: Paul Jeffrey Garnett, Newton-le-Willows (GB)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/157,205

(22) Filed: Sep. 18, 1998

(51) Int. Cl.[7] .................................................. H04L 9/00
(52) U.S. Cl. ........................ 380/265; 380/44; 380/45; 380/46; 380/28; 71/194; 71/200
(58) Field of Search ............................ 380/44, 45, 46, 380/265, 28; 713/193, 194, 200

(56) References Cited

U.S. PATENT DOCUMENTS

| | | | |
|---|---|---|---|
| 5,349,249 A | | 9/1994 | Chiang et al. ............... 307/465 |
| 5,388,157 A | * | 2/1995 | Austin ............................ 380/4 |
| 5,406,627 A | * | 4/1995 | Thompson et al. ........... 380/20 |
| 5,426,378 A | | 6/1995 | Ong ............................. 326/39 |
| 5,768,372 A | | 6/1998 | Sung et al. ..................... 380/3 |
| 5,970,142 A | | 10/1999 | Erickson ....................... 380/21 |
| 6,052,600 A | * | 4/2000 | Fette et al. .................. 455/509 |
| 6,118,869 A | * | 9/2000 | Kelem et al. ................. 380/44 |
| 6,150,837 A | * | 11/2000 | Beal ............................ 326/39 |
| 6,151,393 A | * | 11/2000 | Jeong ......................... 380/265 |
| 6,151,677 A | * | 11/2000 | Walter et al. ............... 713/183 |
| 6,175,247 B1 | * | 1/2001 | Scalera et al. ................ 326/39 |

FOREIGN PATENT DOCUMENTS

| | | |
|---|---|---|
| EP | 0 536 943 A2 | 4/1993 |
| WO | WO 98/38741 | 9/1998 |
| WO | WO 99/46774 | 9/1999 |

\* cited by examiner

*Primary Examiner*—Albert Decady
*Assistant Examiner*—Paul E. Callahan
(74) *Attorney, Agent, or Firm*—O'Melveny & Myers LLP

(57) ABSTRACT

A volatile field programmable gate array (FPGA) having a configurable logical structure portion that is configurable with encrypted configuration data stored external to the FPGA in configuration data memory. On FPGA reconfiguration, for example on power-up, the encrypted configuration data is supplied to an input of the FPGA. In the FPGA, the configuration data is first decrypted by a decryption algorithm embedded in logic, the algorithm using as an operand a decryption key stored in the FPGA in a non-volatile memory, for example EEPROM. The decrypted configuration data is then distributed to the volatile functional portion of the FPGA in a conventional manner. The functional portion may be SRAM. With this design, unauthorized reading of the configuration data of the FPGA by observation of the stream of configuration data transmitted to the FPGA from the external memory, for example during power-up, will only result in encrypted configuration data being obtained. In this way, the design affords enhanced security against the loss of commercially valuable intellectual property and confidential information constituted by the unencrypted configuration data.

7 Claims, 3 Drawing Sheets

FIELD PROGRAMMABLE GATE ARRAYS

BACKGROUND OF THE INVENTION

The invention relates to field programmable gate arrays, more especially but not exclusively to volatile field programmable gate arrays.

A field programmable gate array (FPGA) includes a functional portion comprising a logical structure, the configuration of which is programmable into states defined by configuration data specified for the application concerned at the design stage and loadable into the FPGA.

FPGA's based on volatile technology are in widespread use. The companies Altera Corporation and Xilinx, Inc. have been active in this field. Such volatile FPGA's lose their configuration when power is removed. Volatile FPGA's are therefore reconfigured on power-up by reloading the configuration data which is held externally. To perform this function, volatile FPGA's are provided with circuitry for routing the respective configuration data to the appropriate elements within the functional portion of the FPGA.

At the time of reloading the configuration data on power-up, it would be relatively straightforward to observe the configuration data by intercepting the data stream between the external configuration data store and the FPGA as the FPGA is being configured. Moreover, unauthorized reverse engineering of a programmed FPGA could make use of the intercepted configuration data.

A first possibility would be to obtain unprogrammed FPGA's on the open market and to program them with intercepted configuration data.

A second possibility would be to reverse engineer the design of the FPGA at the logic level from the configuration data and to manufacture FPGA's to that design which could then be programmed with the intercepted configuration data or other configuration data. This would be possible if the relationship between the intercepted configuration data and the resulting configuration of the FPGA were known. It could also then be possible to make modifications to the reverse engineered FPGA design, for example to use the unauthorized reverse engineering of the original FPGA logic as a springboard for further designs, or in order to mask the fact that the design had been obtained by reverse engineering from the original FPGA.

A third possibility, which could be adopted if the relationship between the configuration data and the resulting configuration of the FPGA were not known, would be to reverse engineer the FPGA at the hardware level using slice and scan methods, or other hardware cloning techniques.

There is thus the potential for unauthorized copying of commercially valuable configuration data, which may well have been created following original design work, perhaps involving teams of designers over significant periods of time. Moreover, there is the potential for unauthorized reverse engineering of FPGA hardware at the logic level through the use of configuration data obtained by the unauthorized interception of data during the FPGA configuration process.

SUMMARY OF THE INVENTION

Particular and preferred aspects of the invention are set out in the accompanying independent and dependent claims. Features of the dependent claims may be combined with those of the independent claims as appropriate and in combinations other than those explicitly set out in the claims.

According to a first aspect of the invention there is provided a field programmable gate array designed to receive encrypted configuration data and having on its input side decryption logic for acting on the encrypted configuration data received on reconfiguration, e.g. on power-up, to decrypt it. The decrypted configuration data can then be handled within the field programmable gate array in a conventional manner, i.e. distributed to configure the logical structure of the functional portion of the field programmable gate array.

In an embodiment of the invention, the decryption logic accesses a decryption key stored within the FPGA. The decryption algorithm then uses the key as an operand. The decryption algorithm is preferably stateful rather than stateless. A stateful algorithm may be realized in hardware based on a standard linear feedback shift register (LFSR) design. Typically, the key memory will be formed of non-volatile memory elements, for example EEPROM, and the functional portion of the gate array will be formed of volatile elements, for example SRAM. The key size may be typically of the order of 1K bits or more, with the size being chosen to provide the desired data security level having regard to current code cracking technology. Smaller key sizes may be appropriate for some applications, for example 64 bits, 128 bits or 256 bits.

Since the key memory will typically only constitute a small fraction of the FPGA in comparison to the gate array of the functional portion of the FPGA, the key memory can be realized in the hardware with a relatively large feature size which is beneficial to yields.

According to a second aspect of the invention there is provided a method of processing field programmable gate array configuration data. The method comprises: inputting configuration data; encrypting the configuration data; and storing the encrypted configuration data into a configuration data memory or intermediate recording medium for subsequent loading into a configuration data memory. The encryption may use an algorithm that utilizes an encryption key. A decryption key can be generated from the encryption key and the decryption key can then be embedded in a non-volatile memory of a field programmable gate array to which it is intended to supply the encrypted configuration data.

According to a third aspect of the invention there is provided a method of reconfiguring a field programmable gate array. The method comprises: inputting encrypted configuration data into the field programmable gate array; decrypting the encrypted configuration data; and distributing the decrypted configuration data to configure the field programmable gate array. In the third aspect of the invention the decrypting step may include applying a decryption algorithm to the encrypted configuration data using a decryption key, stored in non-volatile form within the field programmable gate array, as an operand of the algorithm. The decryption algorithm may be stateful or stateless.

According to a fourth aspect of the invention there is provided a field programmable gate array configurable according to externally inputted encrypted configuration data. The gate array has non-volatile memory elements loaded with a decryption key and also data manipulation elements forming part of a configuration data input channel and arranged to apply a decryption algorithm responsive to the decryption key to configuration data passing through the input channel.

Furthermore, a field programmable gate array module may be provided, the module including a field programmable gate array as well as a non-volatile configuration data memory, the field programmable gate array and its memory being interconnected by a configuration data transfer link.

In an alternative embodiment of the invention, there is provided a field programmable gate array comprising: a configurable logical structure having a default state and being configurable into a programmed state by configuration data; an input for receiving encrypted configuration data; and data storage for storing a set of configuration data for defining a programmed state, wherein, in the default state, the configurable logic structure serves to decrypt encrypted configuration data received at the input and to output the decrypted configuration data to the data storage for subsequent reconfiguration of the configurable logic structure into a programmed state. The data storage may comprise a plurality of configuration data holding registers and there may be provided a state machine connected to detect completion of decryption by the configurable logic structure and to trigger the data holding registers to load the configuration data stored therein into the configurable logic structure.

With the above embodiments and aspects of the invention, it is thus possible to improve the security of intellectual property and confidential information embodied in an FPGA design, both in respect of the logic structure designed by the FPGA manufacturer and in respect of the configuration data developed for specific applications by FPGA application designers. The decryption, i.e. descrambling, circuitry is arranged inside the FPGA and operates on the configuration data supplied to it from outside the FPGA. The configuration data supplied to the FPGA is thus stored outside the FPGA in encrypted form for the external circuit that uses the FPGA. Obtaining the configuration data, for example by interception during power-up of the FPGA, will thus result in the interception of encrypted configuration data rather than configuration data in raw, unscrambled form. The task of establishing the relationship between the encrypted configuration data and the logic design of the FPGA can thus be rendered considerably more arduous, since this relationship is made less transparent by the encryption. Moreover, different encryption can be used in different FPGA's, even if the same raw configuration data is to be programmed into a plurality of FPGA's, thus serving to make the interpretation of intercepted configuration data still more difficult.

In one embodiment of the invention, the application designer has the responsibility of defining at least one aspect of the decryption process. In the embodiment described further below, the designer defines a decryption key. A decryption algorithm, which uses the designer-defined key as an operand, is predefined by the FPGA manufacturer and will typically be embedded in the FPGA hardware. A corresponding encryption key and encryption algorithm will also be defined. Corresponding encryption and decryption keys may be identical or different.

In one approach, the FPGA is provided with an input through which the application designer can enter the key into non-volatile memory within the FPGA. With this embodiment, there is preferably also structure for disabling subsequent external access to the key's non-volatile memory to hinder unauthorized access to the key at a later time. For example, the key input may be manufactured to be responsive to a disabling signal which, when received, effects an irreversible change in the FPGA so as to bar subsequent external communication to the decryption key.

In another approach, there is no input by which the key's non-volatile memory may be externally programmed by the application designer. Instead, the application designer informs the FPGA manufacturer of the desired key and the manufacturer embeds the key as a part of the manufacturing process.

The first-mentioned approach has the advantage of enhanced data security regarding the key information which needs only be known to the application designer. The second-mentioned approach has the advantage that the FPGA has no externally accessible channels through to the non-volatile key memory.

The application designer can be given the task of generating the encrypted configuration data set after completion of the application design, i.e. generation of the encrypted configuration data from the raw, unencrypted configuration data. For this, the application designer would use the encryption key corresponding to the above-mentioned decryption key in conjunction with a design tool, which could be provided by the FPGA manufacturer, in which is programmed an encryption algorithm constituting the inverse of the decryption algorithm embedded in the FPGA. The design tool may be software or hardware based.

Since the configuration data is stored in encrypted form, and also transmitted to the FPGA during power-up in encrypted form, a barrier to reverse engineering is erected. If cloning is attempted, the pirate will need to know how the encryption and decryption is configured, but obtaining this information from the FPGA would be likely to be arduous in the extreme. Reverse engineering of the FPGA hardware can be made still more difficult by scattering the non-volatile memory elements used to store the designer-defined decryption data around the FPGA chip. Techniques for dispersing elements in this way are known from the art of secure microcontroller design, where ROM elements are distributed, or spatially scattered, so that they do not form a regular and recognizable pattern which may then be scanned automatically.

BRIEF DESCRIPTION OF THE DRAWINGS

For a better understanding of the invention and to show how the same may be carried into effect the invention is described in the following by way of example with reference to the accompanying drawings in which.

DESCRIPTION OF THE PREFERRED EMBODIMENTS

Figure 1:
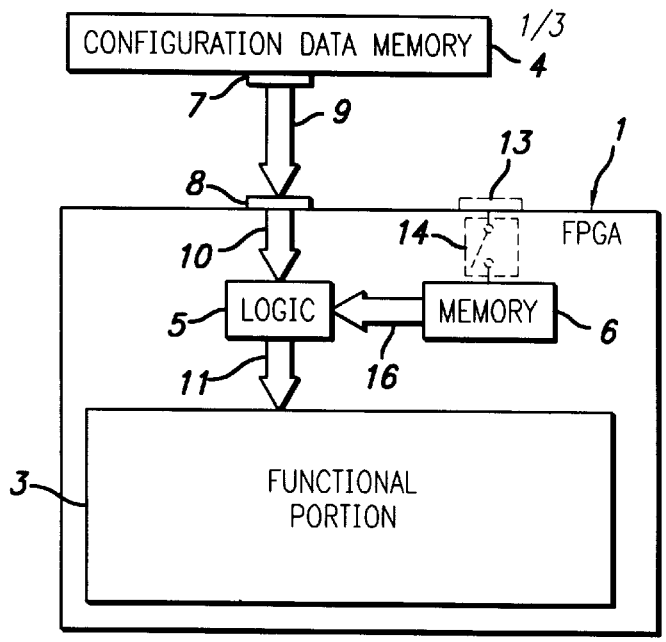
FIG. 1 is a schematic block diagram of a field programmable gate array and a configuration data memory according to embodiments of the invention.

FIG. 1 is a schematic block diagram of a field programmable gate array (FPGA) 1 and associated configuration data storage in the form of memory 4. The FPGA 1 comprises a functional portion 3 comprising a programmable gate array structure. The programmable gate array structure comprises, for example, an M×N array of configurable logic blocks (CLB's)—not shown. The FPGA 1 is connected to the configuration data memory 4 through a communication link 9 which at one end is connected to an output 7 of the configuration data memory 4 and at the other end to an input of the FPGA 1.

The FPGA 1 also includes configuration data decryption circuitry, in the form of logic 5 and memory 6, for applying a decryption process to configuration data received through a communication link 10 extending between the input 8 and an input of the decryption circuitry. The decryption circuitry also includes an output for outputting decrypted configuration data to the functional portion 3 of the FPGA through a communication link 11 so as to configure the functional portion.

The memory 6 serves to store a decryption key and the logic 5 is configured to apply a decryption algorithm to configuration data using the decryption key as an operand of the algorithm. Key data defining the operand is loadable from the memory 6 into the logic 5 through a communication link 16. The decryption key storage 6 is formed of non-volatile elements based on EEPROM technology, that is $E^2PROM$ technology. Alternatively, the non-volatile elements could be based on flash memory, fusible link PROM, UV-EPROM, OTPROM, ferroelectric cells, laser programmable fuses or any other suitable technology compatible with the technology used elsewhere in the FPGA 1. Multiple combinations of technologies may also be used in a single FPGA.

The non-volatile decryption key storage 6 is loadable with the decryption key either at the manufacturing stage, or post-manufacture through decryption key input 13 which is shown with dashed lines in FIG. 1. The FPGA 1 also includes a disabling element 14, in the form of a fusible switch, the purpose of which is to bar external communication to the decryption key storage 6 from the decryption key input 13 after the disabling element 14 has been actuated. The disabling element 14 is responsive to a disabling signal applicable to the decryption key input 13 in that receipt of the disabling signal effects an irreversible change in the disabling switch leaving that switch permanently in the open state thereafter. With this design, the application designer can load the decryption key into the decryption key storage 6, confirm that the decryption key has been successfully loaded and then issue a disabling signal to the input 13 of the decryption key storage 6 to actuate the disabling element 14.

The functional portion 3 of the FPGA 1 is formed of volatile elements based on SRAM technology. The SRAM technology of the functional portion 3 of the FPGA 1 is generally compatible with the EEPROM technology used for the non-volatile decryption key storage 6. Alternatively, other technologies may also be used for the functional portion 3 which fulfill the requirement of compatibility with the technology used for the other FPGA components, most especially the decryption key storage 6.

Figure 5:
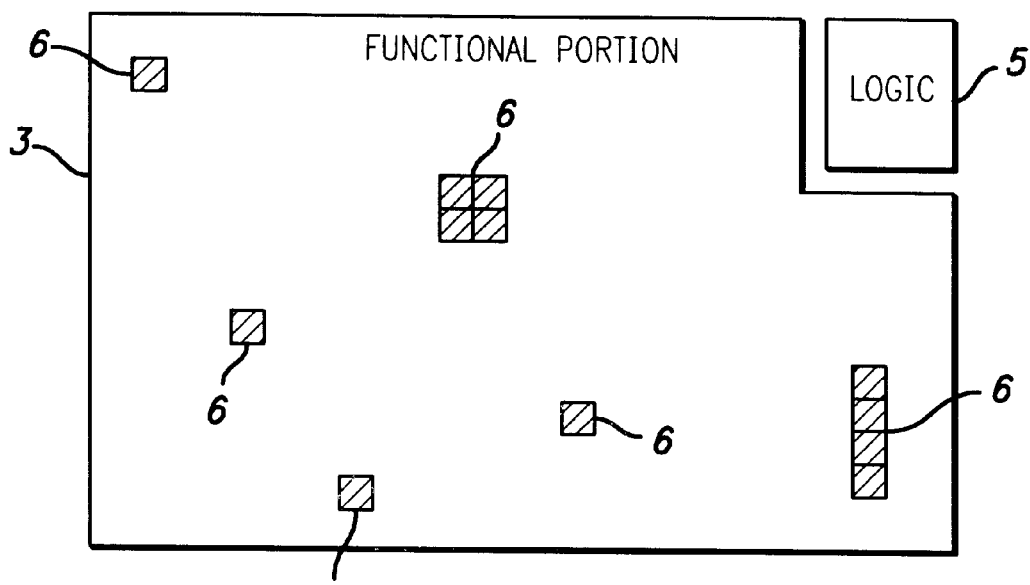
FIG. 5 shows schematically the chip layout of parts of the field programmable gate array of FIG. 1.

To further enhance security, the non-volatile elements of the decryption key memory 6 are physically dispersed among the volatile elements of the functional portion 3 of the FPGA 1. This procedure renders the physical chip layout less susceptible to reverse engineering. FIG. 5 shows schematically a chip layout of parts of the FPGA 1, namely the functional portion 3, the decryption key storage 6 and the decryption algorithm logic 5. The non-volatile elements of the decryption key storage 6 are dispersed over the chip layout among the volatile elements of the functional portion 3. A programmable logic device having a plurality of security bits dispersed over areas of configuration data memory blocks is described in U.S. Pat. No. 5,349,249 to Chiang et al the contents of which is incorporated herein by reference.

To design the FPGA based system, the application engineer will prepare the configuration data for programming the functional portion 3 of the FPGA 1 in a conventional manner. The designer will then select an encryption key and enter that encryption key into an encryption algorithm available to the designer as a design tool. The designer will then apply the encryption algorithm using the encryption key he has specified to encrypt the configuration data. The encrypted configuration data will then be stored by the designer in the configuration data storage 4 which may be embodied in non-volatile memory or any suitable recording medium. The generic encryption algorithm will have an inverse function constituting the decryption algorithm embedded in the decryption algorithm logic 5 of the FPGA 1. The designer-specified encryption key will also have a corresponding decryption key, again linked by an inverse function, which may be the identity function, and this decryption key will be loaded into the decryption key storage 6 of the FPGA 1 either directly by the designer or by the manufacturer at the behest of the designer, as described further above with reference to FIG. 1.

Figure 2:
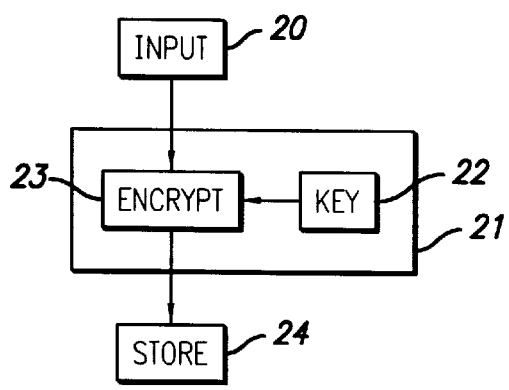
FIG. 2 is a flow diagram showing a method of encrypting field programmable gate array configuration data.

FIG. 2 shows in the form of a flow diagram the designer initiated configuration data encryption process. The method proceeds by inputting a configuration data set in Step 20 and then applying to the configuration data set in Step 21 an encryption algorithm 23 having as an operand the designer-specified encryption key 22 discussed further above with reference to FIG. 1. The encrypted configuration data set output from Step 21 is then stored in Step 24 on a recording medium, such as the configuration data storage 4 illustrated in FIG. 1 or an intermediate storage medium.

Figure 3:
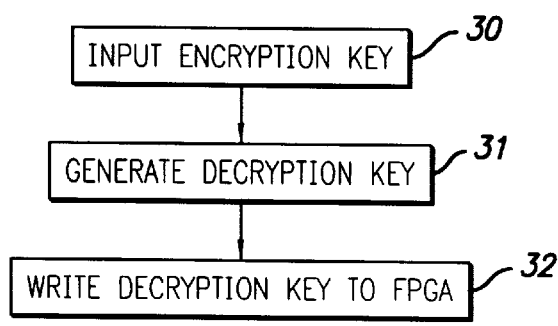
FIG. 3 is a flow diagram showing a method of loading a decryption key into the field programmable gate array of FIG. 1.

FIG. 3 shows in the form of a schematic flow diagram the designer-initiated storage of the decryption key into the non-volatile decryption key storage 6 of the FPGA 1. The process proceeds by inputting the encryption key in Step 30, generating a decryption key from the encryption key in Step 31 and writing the decryption key to the decryption key storage 6 of the FPGA 1 in Step 32.

Figure 4:
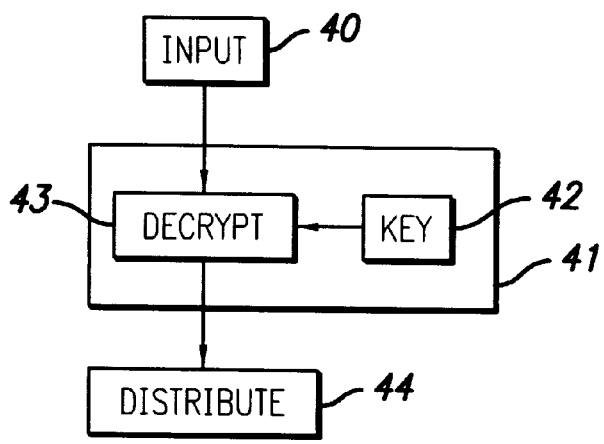
FIG. 4 is a flow diagram showing a method of reconfiguring the field programmable gate array of FIG. 1 with encrypted configuration data.

FIG. 4 shows in the form of a flow diagram a method of reconfiguring the FPGA 1 of FIG. 1 with encrypted configuration data from the configuration data storage 4. Reconfiguration is typically performed on power-up, but may also be performed on-the-fly in some designs. The encrypted configuration data is input into the FPGA in Step 40 and then decrypted in Step 41 by applying a decryption algorithm 43 to the encrypted configuration data. The decryption algorithm 43 uses a decryption key 42 stored in the decryption key storage 6 of the FPGA 1. The decrypted configuration data is distributed in Step 44 within the functional portion 3 of the FPGA 1, thereby to configure the FPGA 1. The decryption algorithm 43 embedded in the decryption algorithm logic 5 is stateful to further enhance security, but could be stateless in lower security systems. A stateful decryption algorithm may be realized in hardware using linear feedback shift register designs, for example.

Figure 6:
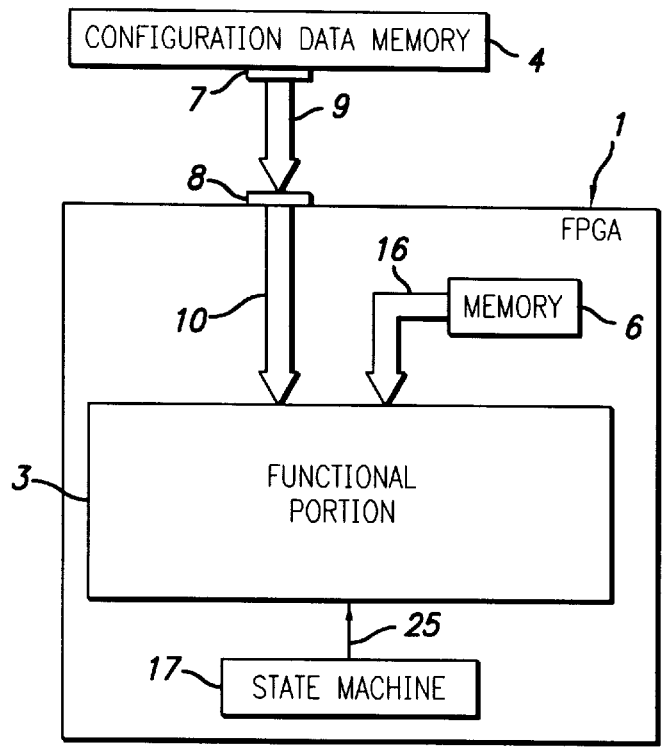
FIG. 6 is a schematic block diagram of a field programmable gate array and a configuration data memory according to an alternative embodiment of the invention.

FIG. 6 shows an alternative embodiment of the invention. Like reference numerals are used for parts having a similar function to those of the embodiment of FIG. 1.

As in the preceding embodiments there is shown an FPGA 1 and associated configuration data memory 4 interconnected through a communication link 9, output 7 and input 8. The FPGA 1 also includes key data memory 6 connected to a communication link 16 for providing the key data for decryption purposes.

By contrast to the preceding embodiments, dedicated decryption circuitry is not provided, but rather the decryption function is subsumed in the functional portion 3 of the FPGA and in a state machine 17. The state machine 17 is configured to detect completion of decryption of a set of configuration data and, in response thereto, to generate an output on communication link 25 to the functional portion 3 of the FPGA. The role of the state machine 17 will be more readily understood after the following discussion of the design of the functional portion 3 of the FPGA.

Figure 7:
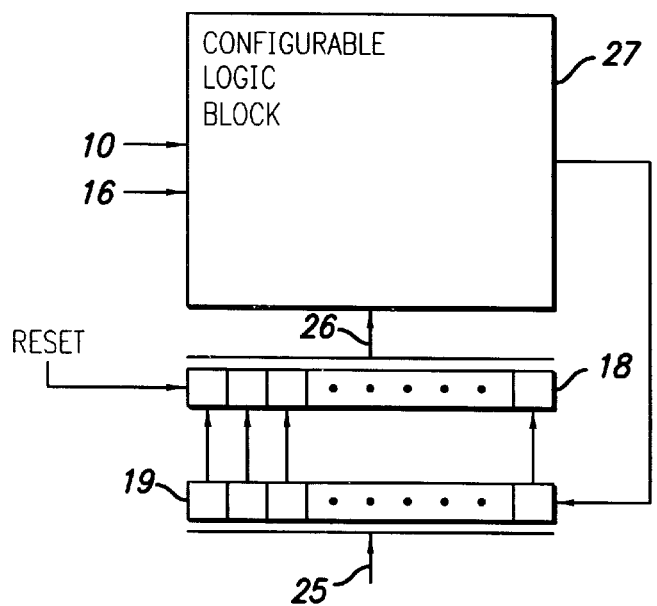
FIG. 7 is a schematic block diagram of a configuration logic block (CLB) and associated registers of the field programmable gate array or FIG. 6.

FIG. 7 shows the modified design of a configurable logic block (CLB) 27 and associated registers of the functional portion 3 in more detail. The functional portion 3 comprises a plurality of CLB's, for example an M×N two-dimensional array thereof, the CLB's being arranged to receive encrypted configuration data from the communication link 10 and key data from the communication link 16.

Associated with the CLB 27 of FIG. 7 there is a set of configuration registers 18. As in a conventional FPGA design, the configuration register set 18 serves to hold configuration data which, when loaded into the CLB 27, configures the CLB 27 according to that data.

However, by contrast to conventional designs, there is also provided a set of holding registers 19 for each CLB. Referring to FIG. 7, the holding register set 19 shown therein serves to hold a further set of configuration data. The holding register set 19 is connected to receive configuration data from an output of the CLB 27 and to load configuration data stored therein into the configuration register set 18. In FIG. 7 the connection between the register sets 18 and 19 is shown as a parallel connection, but it could also be a serial connection. The holding register set 19 also has an input for receiving a trigger signal from the state machine through the state machine communication link 25. Furthermore, the configuration register set 18 has an input for receiving a global reset signal and is designed so that on receipt of a reset signal through this input it adopts a default state.

The contents of the configuration register set 18 in the default state, when loaded into the CLB 27, causes the FPGA to operate as a decryption engine so that encrypted configuration data received through the communication link 10 is decrypted according to the key data received through the communication link 16, output from the CLB 27 in decrypted form, and supplied to the holding register set 19 where it is stored. Completion of the decryption process is detected by the state machine which, in response thereto, outputs a signal to communication link 25, which when received by the holding register set 19, causes the contents of the holding register set 19, i.e. the decrypted configuration data, to be loaded into the main configuration register set 18 and then into the CLB 27 which then changes state from its decryption engine state into the desired programmed state for conventional FPGA operation. A programmable logic device having a configuration memory capable of storing two sets of configuration data is described in U.S. Pat. No. 5,426,378 to Randy T. Ong, the contents of which are incorporated herein by reference.

As will be appreciated, the embodiment of FIGS. 6 and 7 may be modified to include a decryption key input and disabling element as described further above with reference to FIG. 1.

The alternative embodiment described above with reference to FIGS. 6 and 7 can be implemented with a reduced number of devices to provide the added functionality of decryption with a reduced chip area. This is achieved by designing the functional portion 3 of the FPGA so that, as a default, it adopts a decryption configuration in which it operates as a decryption engine.

In the light of the foregoing it will be appreciated that a field programmable gate array may be provided which comprises a functional portion having a configurable logical structure; an input for receiving configuration data for configuring the functional portion; and decryption means for applying a decryption process to the configuration data to generate decrypted configuration data for configuring the functional portion of the field programmable gate array. The decryption means may be made up of means for storing a decryption key and means for applying a decryption algorithm to the configuration data using the decryption key as an operand of the algorithm. In the conventional manner there may also be provided means for distributing the decrypted configuration data from the decryption means to the functional portion so as to configure the functional portion.

It will be appreciated that although particular embodiments of the invention have been described, many modifications/additions and/or substitutions may be made within the spirit and scope of the present invention as defined in the appended claims.

What I claim is:

1. A field programmable gate array comprising:
input for receiving encrypted configuration data;
a configurable logical structure having a default state and being programmable into any one of a plurality of programmed states, each defined by a set of decrypted configuration data; and
data storage for storing a set of decrypted configuration data for defining one of the programmed states,
wherein, in the default state, the configurable logic structure is configured to decrypt encrypted configuration data received at the input and to store a corresponding decrypted configuration data set in the data storage for subsequent reconfiguration of the configurable logic structure into the programmed state defined by that decrypted configuration data set.

2. A field programmable gate array according to claim 1, wherein the data storage comprises a plurality of configuration data holding registers.

3. A field programmable gate array according to claim 1, comprising a state machine connected to detect completion of decryption by the configurable logic structure and to trigger the data storage to load the configuration data stored therein into the configurable logic structure, thereby to reconfigure the configurable logic structure into a programmed state.

4. A field programmable gate array according to claim 1, wherein the configurable logical structure is formed of volatile elements.

5. A field programmable gate array according to claim 4 wherein the volatile elements are SRAM elements.

6. A field programmable gate array according to claim 1, further comprising a key input through which a decryption key is loadable a decryption key storage.

7. A field programmable gate array according to claim 6, further comprising a disabling element constructed so that receipt of an externally applicable disabling signal causes an irreversible change to the field programmable gate array so as to bar subsequent external communication to the decryption key storage.

* * * * *